(12) United States Patent
Leventis et al.

(10) Patent No.: US 8,877,824 B2
(45) Date of Patent: Nov. 4, 2014

(54) MULTIFUNCTIONAL POROUS ARAMIDS (AEROGELS) AND FABRICATION THEREOF

(71) Applicant: The Curators of the University of Missouri, Columbia, MO (US)

(72) Inventors: Nicholas Leventis, Rolla, MO (US); Chariklia Sotiriou-Leventis, Rolla, MO (US); Chakkaravarthy Chidambareswarapattar, Rolla, MO (US)

(*) Notice: Subject to any disclaimer, the term of this patent is extended or adjusted under 35 U.S.C. 154(b) by 0 days.

(21) Appl. No.: 13/909,574

(22) Filed: Jun. 4, 2013

(65) Prior Publication Data

US 2013/0338247 A1 Dec. 19, 2013

Related U.S. Application Data

(60) Provisional application No. 61/689,352, filed on Jun. 4, 2012.

(51) Int. Cl.
*E04B 1/88* (2006.01)

(52) U.S. Cl.
CPC ........................ *E04B 1/88* (2013.01)
USPC .............................................. 521/97; 521/157

(58) Field of Classification Search
CPC ........................................................ E04B 1/88
USPC ...................................................... 521/97, 157
See application file for complete search history.

(56) References Cited

U.S. PATENT DOCUMENTS

2014/0128488 A1* 5/2014 Lotti et al. ...................... 521/76

* cited by examiner

*Primary Examiner* — Nathan M Nutter
(74) *Attorney, Agent, or Firm* — Brannon Sowers & Cracraft PC; C. John Brannon

(57) ABSTRACT

The present disclosure provides a series of new and improved porous polyamide aerogels derived from multifunctional aromatics that combine the high mechanical strength of aramids with the pore structure of aerogels. The polyamide aerogels have a hyperbranched structure, relatively low density, high porosity and are derived from functionalized monomers having more aromatic groups than functional groups. The present disclosure also provides a new method for producing the porous polyamide aerogels by polymerizing an aromatic multifunctional carboxylic acid with an isocyanate at moderate reaction condition followed by drying with liquid $CO_2$.

20 Claims, 7 Drawing Sheets

MULTIFUNCTIONAL POROUS ARAMIDS (AEROGELS) AND FABRICATION THEREOF

CROSS-REFERENCE TO RELATED APPLICATIONS

This application claims the benefit of U.S. Provisional Application No. 61/689,352, filed Jun. 4, 2012, which is hereby incorporated by reference.

GRANT STATEMENT

This invention was made with Government support under the Grant CHE-0809562 awarded by the National Science Foundation and the Grant W911 NF-10-1-0476 awarded by the US Army Research Office. The Government has certain rights in the invention.

FIELD OF INVENTION

The present disclosure relates to Kevlar-type polyamide aerogels and more specifically to a new series of porous polyamide aerogels with increased mechanical strength and improved thermally and acoustic insulation.

BACKGROUND OF INVENTION

Polymeric cellular solids (foams) nearly eliminate convective heat transfer and thus combine low density with low thermal conductivity, both properties desirable for thermal insulation. Further reduction in the rate of heat transfer is realized with pore sizes below the mean free path of the pore-filling gas (68 nm for air at standard temperature-pressure (STP)). Such mesoporous (2-50 nm) materials include aerogels which typically exhibit poor mechanical properties. Systematic efforts to improve the mechanical properties of polymeric aerogels by crosslinking fibrous cellulose wet-gels with isocyanates have resulted in some improvement of mechanical properties, but have proven time-consuming and inefficient.

Therefore, what is needed are polymeric aerogels having sufficient strength and structural integrity without the need for post-gelation treatment and efficient methods for their production from readily available starting materials. This present disclosure addresses these needs.

SUMMARY

The present disclosure provides a series of new and improved porous aerogels in the form of hyperbranched polyamide aerogels. The polyamides are prepared from monomers having increased levels of aromatic content per functional group compared to conventional polyamides. Hyperbranched polymers have highly branched architecture with a variety of reactive and non-reactive end groups. In the preparation of certain polymers, it has proven useful to utilize monomers in which the ratio of aromatic rings to functional groups is at least about 1:1.5. Their structure resembles the branching exhibited by many plants, particularly trees. One aspect of the current disclosure involves the new hyperbranched polymeric aerogel having the following repeating units:

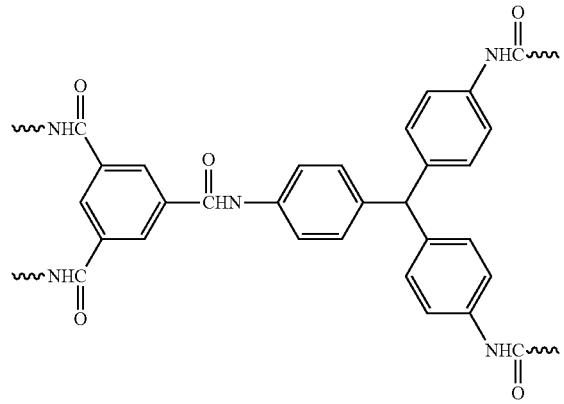

I.

The hyperbranched structure of the polymer can be represented by the following formula:

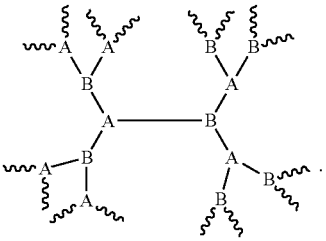

II where A is:

B is:

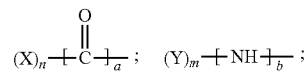

and

X and Y are aromatic groups and units A and B are linked through an amide group. In certain embodiments the ratio of (a+b):(n+m) is at least about 1:1.5. In certain applications, A can be:

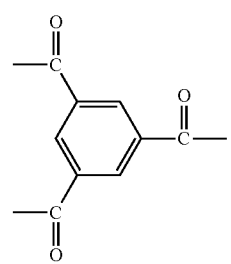

and B can be:

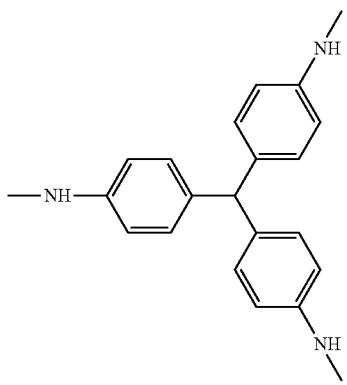

Certain of the porous polymeric aerogels of the present disclosure exhibit a bulk density between 0.205 to 0.399 g/cc, porosity between 69% to 84%, a Young's modulus equal or less than 50 MPa, specific energy absorption between 2 to 37 J/g, a speed of sound between 47 to 375 m/s and a thermal conductivity between 0.028 to 0.039 W/m·K.

The present disclosure further provides a novel method for synthesis of the porous polyamide aerogel with a hyperbranched structure from monomers having increased levels of aromatic content per functional group. Suitable monomers include the combination of an aromatic polycarboxylic acid and an aromatic polyisocyanate. The polymerization proceeds under mild to moderate conditions. Accordingly, one aspect of the present disclosure involves a method for synthesizing the polyamide aerogel from trifunctional aromatic carboxylic acids and trifunctional isocyanates in a dilute aprotic solvent such as DMF at a moderately elevated temperature. In certain examples, the monomer concentrations were selected to provide resulting polymer slurries containing between: (a) about 5-25 wt. % solids, (b) 10-25 wt % of solids, and (c) 10-15 wt. % solids. A still further aspect of the present disclosure involves the step of drying the wet-gels with liquid $CO_2$. A suitable polycarboxylic acid includes s 1,3,5-tricarboxybenzene (trimesic acid) whereas suitable aromatic polyisocyanates include tris(4-isocyanatophenyl)-methane, methylene biphenyl diisocyanate, 1,3-phenylene diisocyanate, 1,1'-biphenyl diisocyanate and 1,1'oxy-bis-(isocyanatobenzene).

DETAILED DESCRIPTION

Figure 1:
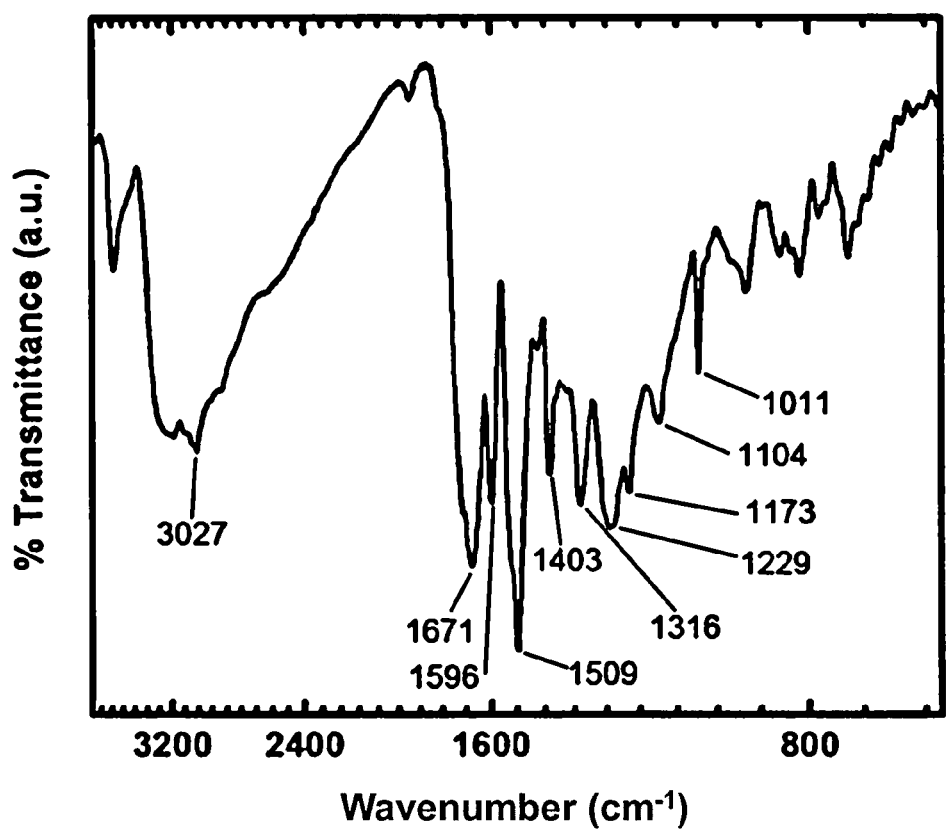
FIG. 1 provides an IR spectrum of a polyamide aerogel prepared from trimesic acid and tris(4-isocyanatophenyl) methane using 15% w/w solids in DMF.

Before the present methods, implementations and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting. Neither are mechanisms which have been provided to assist in understanding the disclosure meant to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often though may not occur, and that the description includes instances where said event or circumstance occurs and instances where it does not.

The present disclosure provides a series of new and improved multifunctional porous aramids (aerogels) having high mechanical strength in combination with the porosity of an aerogel. The design of such aerogels imposes several interrelated chemical and structural issues. According to cellular solid theory, the mechanical strength of porous solids (e.g., honeycombs) increases with density and pore wall thickness. In aerogels, that design rule is complicated by well-defined weak points on the pore walls. Covalently bridging (e.g. crosslinking) inorganic skeletal nanoparticles (e.g., silica, vanadium, rare earth oxides) with polymers renders the structure robust, without adding substantially to the pore wall thickness. Normalized for density, the mechanical properties of those porous materials (referred to as crosslinked polymer aerogels) compete with those of bulk materials and in some aspects, (e.g., the specific energy absorption under compression) surpass the latter. Accomplishing a similar result with a polymer such as Kevlar®- or Nomex®-type aramids presents several challenges because of the limited chances for crosslinking and because the long polymeric strands tend to pack densely in order to maximize their non-covalent interactions (e.g., hydrogen bonding). Initial efforts involved the polymerizations focused on difunctional, single aromatic core monomers that formed flocs and were not characterized further. The polymerization of trifunctional single aromatic monomers initially provided hyperbranched structures that exhibited significant solubility and liquid crystalline properties in certain solvents. However, polymerizations in DMF provided large aggregates (molecular weights in the 700K-1 M range), which at high concentrations behave as shear thinning gels. In order to further decrease the solubility of the aerogel, the aromatic content of the monomer per functional group reacting was further increased. Kevlar and Nomex are registered U.S. trademarks belonging to E.I. du Pont de Nemours and Company CORPORATION DELAWARE 1007 Market Street Wilmington DELAWARE 19898.

Thus, the present disclosure provides a series of new and improved porous hyperbranched polyamide aerogels formed from monomer systems having increased ratios of aromatic content per functional group compared to conventional polyamides. According to one aspect of the present disclosure, the polyamide aerogels may be crosslinked by utilizing monomers having the formula:

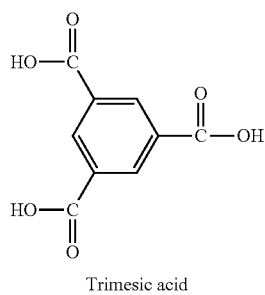

Trimesic acid

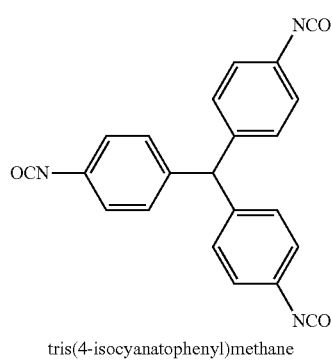

tris(4-isocyanatophenyl)methane

Polymerization of trimesic acid and tris(4-isocyanatophenyl) methane provided a hyperbranched polyamide aerogel having repeating units illustrated below.

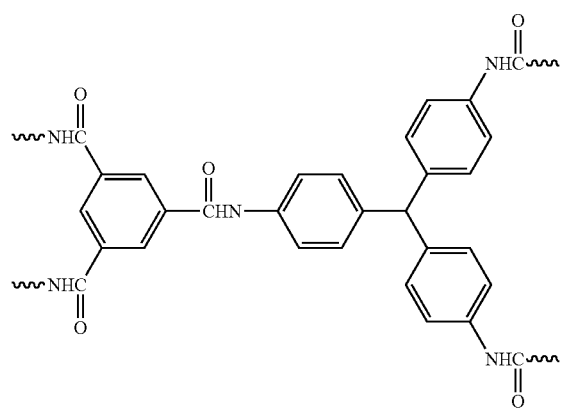

The hyperbranched structure of the polymer is illustrated by structure III above. In addition, the direction of the amide linkage can be reversed by utilizing monomers such as 1,3, 5-Tris(4-carboxyphenyl)benzene and 1,3,5-triisocyanatobenzene.

The present disclosure further provides a method for the synthesis of the new porous polyamide aerogels. Rather than adopting the conventional pathways to polyamides either by dehydration of the salt product of the reaction between carboxylic acids and amines at relatively high temperature, or by multistep reactions of acid halides and amines, the present method employs an underutilized pathway using the multifunctional aromatic carboxylic acids and the multifunctional aromatic isocyanates in a one-step reaction carried out under mild conditions.

Polymerization of trifunctional aromatic carboxylic acids and isocyanates in dilute DMF solutions using the reaction of the carboxylic acid group (—COOH) with isocyanates (—N═C═O) to produce amides (—NH(C═O)—) induces early phase separation of surface-active aramid nanoparticles that form a solvent-filled 3D network stabilized against collapse by the chemical energy of the interparticle covalent bridges (crosslinks). These wet-gels can then be dried with liquid $CO_2$ to produce lightweight and highly porous materials having substantial strength.

Aspects of the present method include polymerizing trifunctional aromatic carboxylic acids and isocyanates in dilute DMF solutions at a moderately elevated temperature to form a polyamide aerogel. Further aspects of the present method involve the steps of adding a solvent to the wet-gels that is miscible with liquid $CO_2$.

Equations 1 and 2 provides an exemplary synthetic pathway for producing a polyamide aerogel and a possible step-by-step reaction mechanism illustrating the polymerization of a carboxylic acid and an isocyanate. As shown in equation 1, the process is implemented with benzene-1,3,5-tricarboxylic acid (trimesic acid, TMA) and tris(4-isocyanatophenyl) methane (TIPM) in DMF solutions heated to as high as about 135° C., but more preferably as high as about 90° C., with the release of $CO_2$.

EXAMPLES

Synthesis of Aramid Aerogel.

A solution of TIPM as received (Desmodur RE, 13.3 mL (13.6 g), containing 3.67 g of TIPM in anhydrous ethylacetate, 0.01 mol) and TMA (2.10 g, 0.01 mol) in varying amounts of anhydrous DMF (e.g., 24.0 mL (22.6 g) for 15% w/w solids) was stirred at 90° C. under $N_2$ for 1 h. The resulting sol was poured into polypropylene molds (Wheaton polypropylene OmniVials, Part No. 225402, 1 cm diameter), which were sealed in a glove box and heated at 90° C. for 24 h. (The 15% w/w sol gels in 2.5 h from mixing.) Gels were washed with DMF, acetone (4× with each solvent, using 4× the volume of the gel) and dried with liquid $CO_2$ in the form of a supercritical fluid (SCF). The same procedure was followed at room temperature and at 135° C. (using glass molds) for the CPMAS $^{13}C$ NMR studies.

The method provided is essentially a one-pot, one-step process carried out according to equation 1.

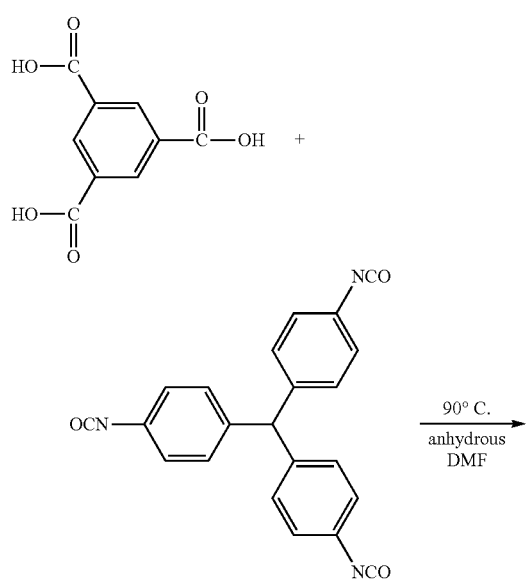

(1)

Figure 3:
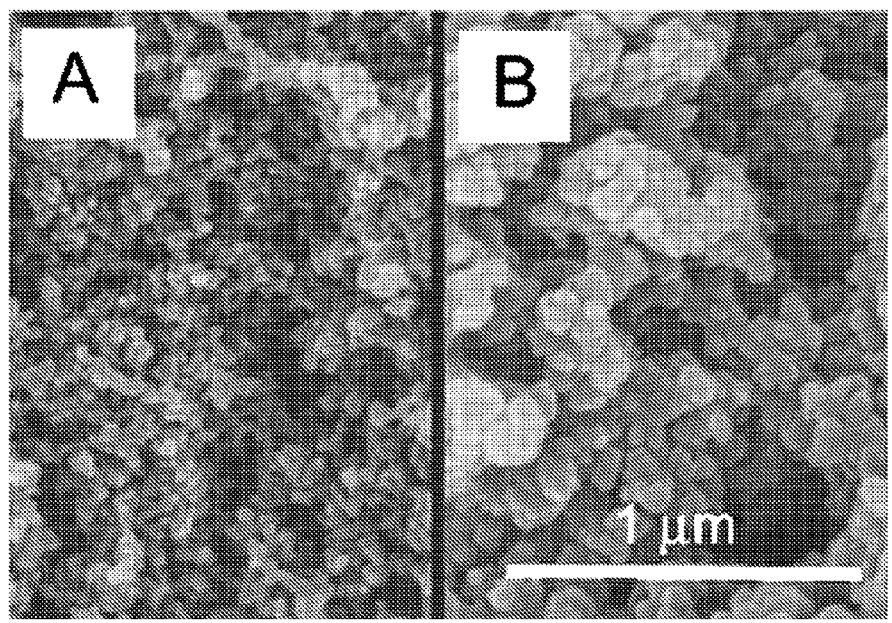
FIG. 3 provides SEM's of aramid aerogels at 5% w/w solids (A) and 25% w/w solids (B).

Monolithic aerogels of variable density were obtained by varying the monomer concentration in the sol. The IR spectrum reproduced in FIG. 3 illustrates the NH stretch at 3027 $cm^{-1}$, the amide carbonyl stretch at 1671 $cm^{-1}$ and the NH bending vibration coupled to the C—N stretch at 1509 $cm^{-1}$. The reaction of the carboxylic acid (—COOH) with an isocyanate (—N=C=O) is a room temperature process yielding an intermediate that is a mixed carbamic-carboxylic anhydride intermediate as illustrated in equation (2).

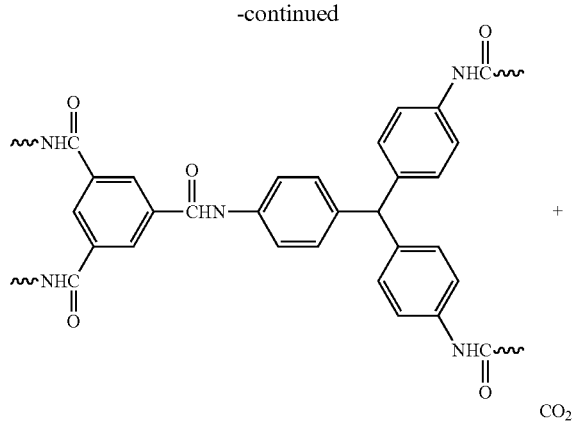

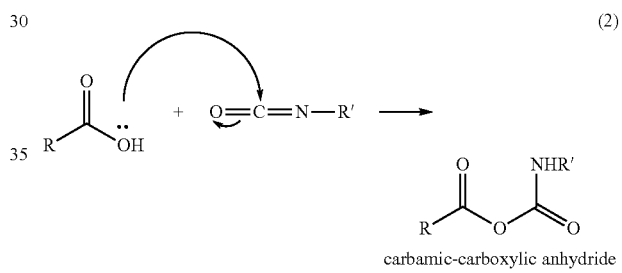

(2)

Upon heating the intermediate, decarboxylation occurs producing an amide either by losing the isocyanate sp carbon (equation 3a), or bi-molecularly through urea and anhydride intermediates (equation 3b).

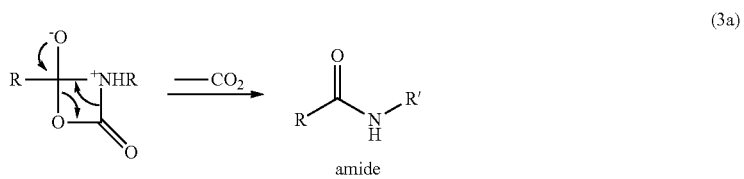

(3a)

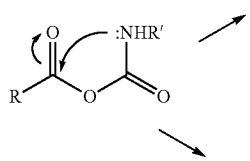

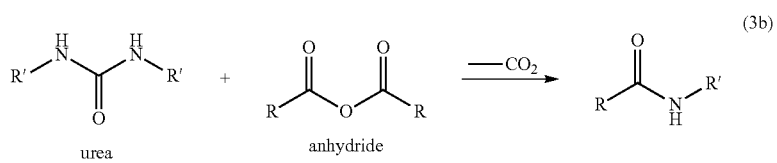

(3b)

Figure 2:
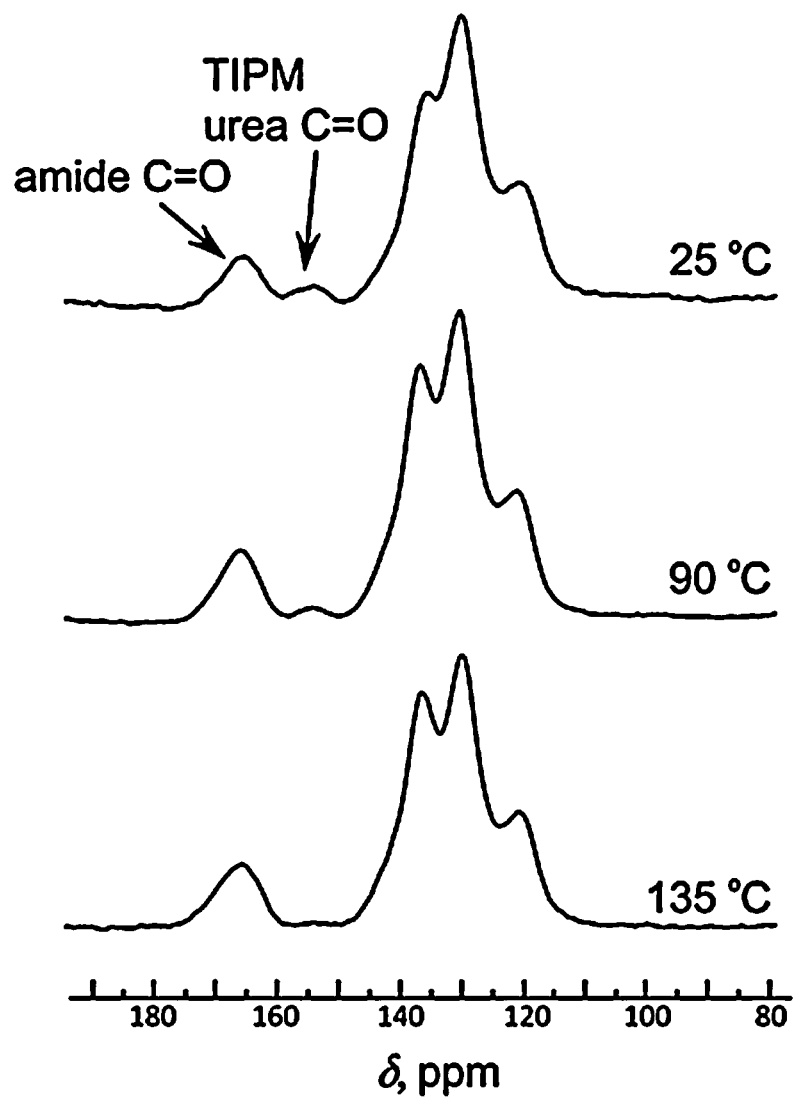
FIG. 2 provides a solid state $^{13}C$ NMR spectra of polyamide aerogels prepared from trimesic acid and tris(4-isocyanatophenyl)methane using 15% w/w solids in DMF at the three temperatures indicated.
Figure 4:
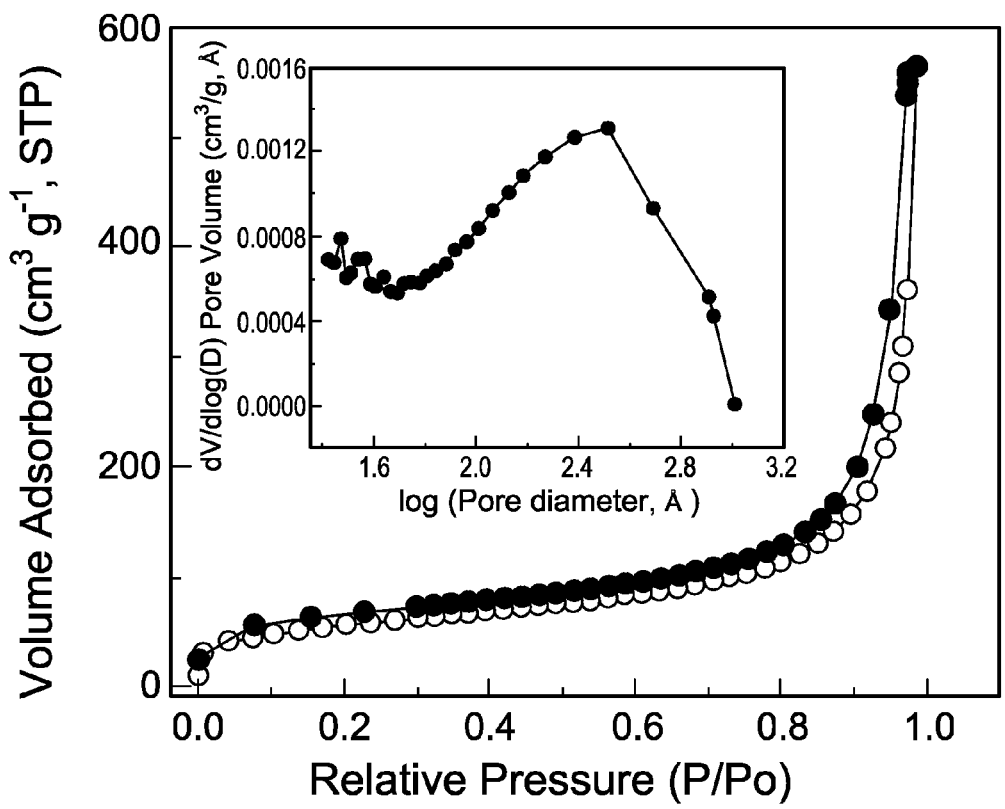
FIG. 4 provides an $N_2$-sorption isotherm (obtained at 77K) of a 15% w/w solids sample (open circles:adsorption; dark circles:desorption). Inset: Pore size distribution via the Barrett-Joyner-Halenda (BJH) plot applied on the desorption branch of the isotherm.

However, once urea and anhydride have been fixed on the network by reaction of their other functional groups via equation 3a, they can no longer diffuse and react further to amide via equation 3b. Indeed, the presence of TIPM-derived polyurea was detected with solids $^{13}C$ NMR at 157 ppm (FIG. 2) by comparison with the spectrum of the pure polymer. The amount of TIPM-derived urea decreases by gelation at elevated temperatures (FIG. 4), implying that equation 3a and the first step of equation 3b proceed with comparably fast rates, while the second step of equation 3b (formation of amide by loss of $CO_2$) is significantly slower and is accelerated by heating. All data presented below concern gels obtained by heating to 90° C. (equation 1). Combinations of terephthalic acid/TMT; trimesic acid/diphenyl methane diisocyanate; and TMA/TMI all provided gels.

in the modulated T4P mode. The raw Cp data for the polyamide aerogels were multiplied by a factor of 0.920±0.028 based on measuring the heat capacities of rutile, KCl, Al, graphite, and corundum just before the current experiments and comparing values obtained with the literature values.

Materials Characterization.

Characterization data determined for the polymeric aerogels is summarized in Table 1. The monoliths shrink significantly (from 11% to 41% in linear dimensions relative to their molds, Table 1) in inverse order to monomer concentration. Consequently, bulk densities ($\rho_o$) do not vary proportionally to monomer concentration, ranging from 0.21 to 0.40 g cm$^{-3}$ even though the monomer concentration was varied five-fold, from 5% to 25% w/w solids (lower monomer concentrations did not gel).

TABLE 1

Materials characterization data of polyamide aerogels:

| Solids [% w/w] | Shrinkage [%]$^{a,b}$ | $\rho_o$ [g cm$^{-3}$]$^a$ | $\rho_s$ [g cm$^{-3}$]$^c$ | Crystallinity 2θ [% degrees)] | Porosity [% v/v] | BET surface area (micropore) [m$^2$g$^{-1}$] | Pore diameter [nm]$^d$($^e$) | Particle diameter [nm]$^f$ |
|---|---|---|---|---|---|---|---|---|
| 5  | 40.9 ± 0.9 | 0.205 ± 0.008 | 1.266 ± 0.014 | 79 (19, 44) | 84 | 380 (37) | 23.7 (43.0)   | 12.5 |
| 10 | 31.1 ± 0.5 | 0.288 ± 0.005 | 1.268 ± 0.010 | 47 (19, 44) | 77 | 354 (42) | 28.1 (30.3)   | 13.4 |
| 15 | 22.5 ± 0.3 | 0.324 ± 0.010 | 1.282 ± 0.010 | 51 (19, 44) | 75 | 172 (29) | 19.8 (53.6)   | 27.2 |
| 20 | 17.4 ± 0.1 | 0.361 ± 0.008 | 1.277 ± 0.008 | 60 (20, 44) | 72 | 65 (10)  | 22.9 (122.3)  | 72.3 |
| 25 | 11.2 ± 0   | 0.399 ± 0.005 | 1.279 ± 0.007 | 58 (20, 44) | 69 | 15 (2)   | 33.5 (459.8)  | 313  |

$^a$represents the Average of 3 samples.
$^b$Shrinkage = 100 × [1-(sample diameter/mold diameter)].
$^c$Single sample, average of 50 measurements.
$^d$By the 4× VTotal/σ method and VTotal by the single-point adsorption method.
$^e$In parentheses, VTotal via VTotal = $(1/\rho_o)-(1/\rho_s)$.
$^f$Particle diameter = $6/\rho_s\sigma$.

General Testing Methods.

Supercritical fluid (SCF) drying was carried out in an autoclave (SPI-DRY Jumbo Supercritical Point Dryer, SPI Supplies, Inc. West Chester, Pa.). Bulk densities were determined from sample weight and dimensions. Skeletal densities were determined with helium pycnometry using a Micromeritics AccuPyc II 1340 instrument. N2 sorption porosimetry was carried out with a Micromeritics ASAP 2020 Surface Area and Porosity Analyzer. IR samples were included in KBr pellets with a Nicolet-FTIR Model 750 Spectrometer. Solid-state $^{13}C$ NMR determinations were carried out with a Bruker Avance 300 Spectrometer set at 75.475 MHz for carbon frequency using magic angle spinning (at 7 kHz) with broadband proton suppression and the CPMAS TOSS pulse sequence for spin sideband suppression. SEM determinations were carried out with Au-coated samples on a Hitachi S-4700 field emission microscope. X-ray diffraction (XRD) was carried out with a PANalytical X-Pert Pro Multi-Purpose Diffractometer (MPD) and a Cu Kα radiation source. Mechanical testing under compression utilized an Instron 4469 universal testing machine frame, following the testing procedures and specimen length (2.0 cm) to diameter (1.0 cm) ratio specified in ASTM D 1621-04a (Standard Test Method for Compressive Properties of Rigid Cellular Plastics). Thermal diffusivity measurements, R, were made with a Netzsch NanoFlash Model LFA 447 flash diffusivity instrument using disk samples ~1 cm in diameter, 2.0-2.2 mm thick. Heat capacities, Cp, were determined at 23° C. with powders of the same samples (4-8 mg), needed for the determination of their thermal conductivity, Λ, utilizing a TA Instruments Differential Scanning Calorimeter Model Q2000 calibrated against a sapphire standard and run from −10° C. to 40° C. at 0.5° C. min$^{-1}$ Shrinking does not take place during gelation, aging, or solvent exchange, on the contrary, wet-gels swell by ~10% in linear dimensions upon transfer from their molds into fresh DMF. All shrinking takes place during drying with supercritical fluid (SCF) $CO_2$. Therefore, behaving as semi-permeable membranes, polyamide wet-gels swell till stretching of the framework—which, therefore must be rather flexible—balances the osmotic pressure of the internal "solution". Then, complete collapse upon drying is halted by the covalent bonding of the network. Skeletal densities, $\rho_s$, fall in the 1.27-1.28 g cm$^{-3}$ range, close to, but lower than the densities of Kevlar® and Nomex® (1.44 g cm$^{-3}$). The invariance of $\rho_s$ with monomer concentration signifies absence of closed pores, and the values reflect the effect of crosslinking on molecular packing. Indeed, X-ray diffraction shows high crystallinity, but peaks are broad (unlike in Kevlar® where they are sharp), precluding large-scale order. Porosities, Π, calculated from $\rho_o$ and $\rho_s$ via $\Pi=100\times[(1/\rho_o)-(1/\rho_s)]/\rho_o$, decrease from 84% to 69% v/v as $\rho_o$ increases. Despite shrinkage, all samples are highly porous.

Microscopically, aramid aerogels show aerogel-like connectivity of smaller particles into larger agglomerates (FIG. 3). Particle size increases with monomer concentration. All $N_2$ sorption isotherms rise above P/Po=0.9 and do not reach saturation, consistently with the macroporosity observed in the SEM's. Nevertheless, narrow hysteresis loops and substantial specific volumes adsorbed at low P/Po values indicate also the presence of both meso and microporosity. Brunauer-Emmett-Teller (BET) analysis yields high surface areas (σ, 380 m$^2$ g$^{-1}$) for the lower density samples, decreasing dramatically (to 15 m$^2$ g$^{-1}$) as the concentration of monomers increases. In all cases, about 10% of σ is attributed to micropores (via t-plot analysis, Harkins and Jura Model). Average pore diameters calculated by the $4V_{Total}/\sigma$ method using $V_{Total}$ either from the highest adsorption point in the isotherm, or via $V_{Total}=(1/\rho_o)-(1/\rho_s)$, diverge as $\rho_o$ increases, consistently with larger particles yielding macropores. Calculated particle diameters ($=6/\rho_s \sigma$, Table 1) increase with monomer concentration, but remain smaller than those observed in SEM. Therefore, SEM particles are higher aggregates. The lower shrinkage and the increasing particle size with monomer concentration parallels the well-studied base-catalyzed gelation of resorcinol-formaldehyde at high resorcinol-to-catalyst ratios (slower reaction), suggesting microphase separation is convoluted with kinetically controlled polymerization.

Mechanical Characterization.

Figure 5:
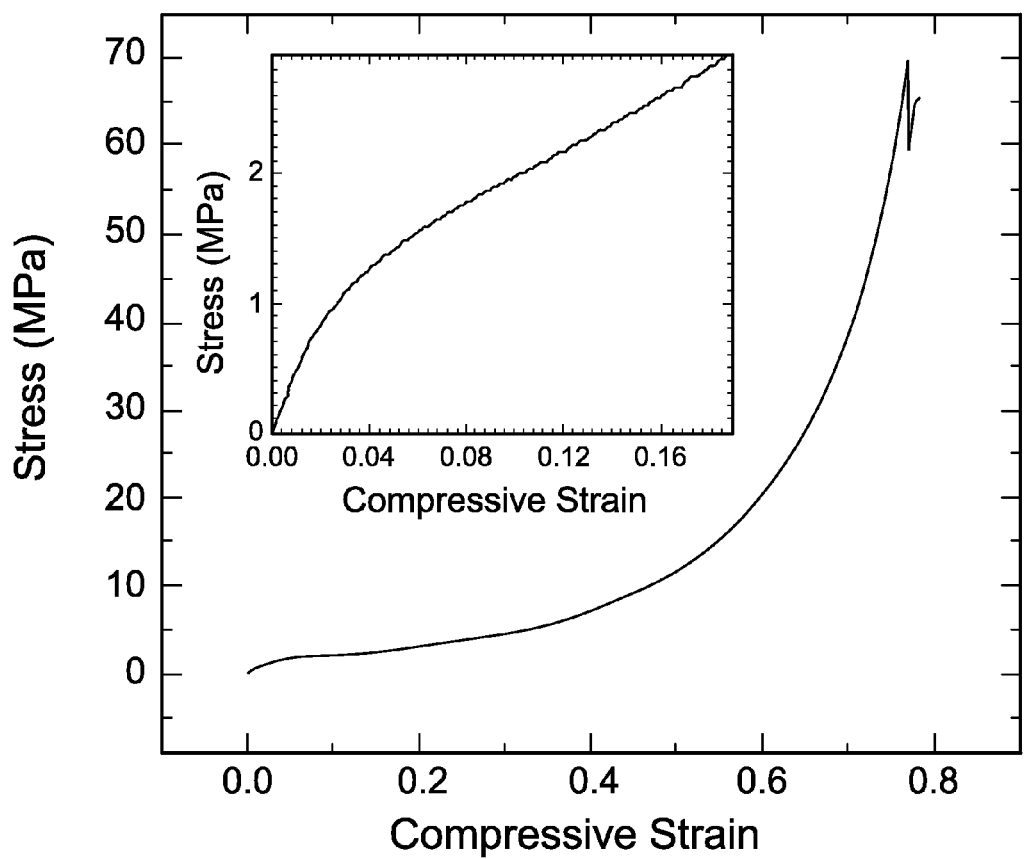
FIG. 5 provides a typical quasi-static compression data of a 15% w/w solids aramid aerogel sample. (Diameter ~0.78 cm; Length:Diameter=2:1.)
Figure 6:
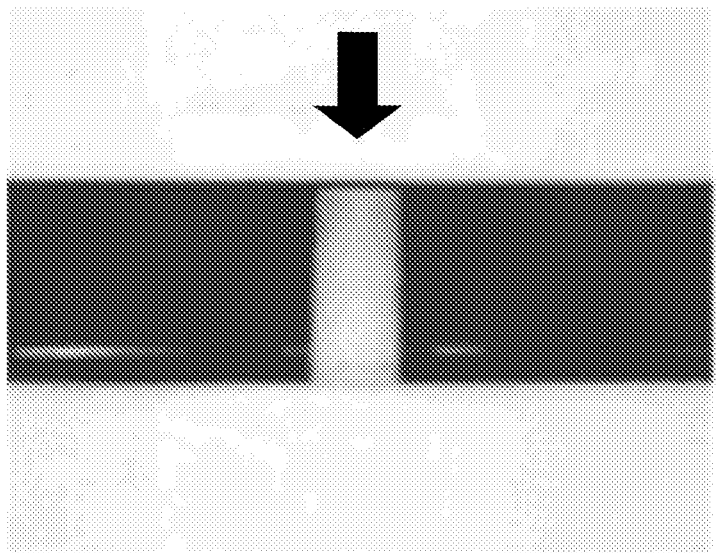
FIG. 6 illustrates the low-strain region magnified for the sample examined in FIG. 5.
Figure 6:
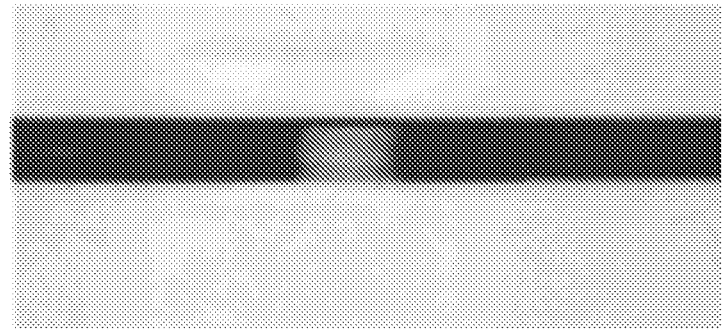

Larger particles are expected to have fewer interparticle contacts, therefore lower covalent connectivity and thus lower chemical energy stored in the 3D structure. Hence, not surprisingly, for not very different $\rho_o$, the mechanical properties under quasi-static compression (FIG. 5) decrease precipitously as monomer concentration increases (Table 2). Overall, stress-strain curves show a short linear range (<3% strain) followed by plastic deformation and inelastic hardening. At low $\rho_o$, i.e., with smaller particles, samples fail at high (~80%) strain, but not catastrophically. The ultimate compressive strength per unit density (238 MPa/(g cm$^{-3}$), calculated from Table 2 for the 0.324 g cm$^{-3}$ samples) is within 10% equal to that of Kevlar® 49 (257 MPa/(g cm$^{-3}$) calculated from literature values of 370 MPa at 1.44 g cm$^{-3}$). The Young's modulus, E, (slope of the linear range at <3% strain, see FIG. 5, inset), is controlled by the amide interparticle bridges and is comparable to that of other isocyanate-derived organic aerogels of similar $\rho_o$, but is also significantly lower than that of polyurea-crosslinked silica and vanadium (233 and 206 MPa, at 0.55 and 0.44 g cm$^{-3}$ respectively), whose stiffness is controlled by the inorganic framework. The low values of the Young's modulus translate into open-air-like speed of sound waves (calculated using equation 4 below, see Table 2), rendering those materials suitable for acoustic insulation. The speed of sound was determined by the following equation:

$$\text{speed of sound} = (E/\rho_o)^{0.5} \quad (4)$$

At the same time, however, the combination of high fail strains and high ultimate compressive strengths has yielded high integrated areas under the stress/strain curves. Thus, the specific energy absorption under compression (a measure of toughness) reaches 37 J g$^{-1}$, surpassing Kevlar® 49-epoxy composites (11 J g$^{-1}$), and renders polyamide aerogels appropriate for similar applications, for example as core for armor plates.

TABLE 2

Selected mechanical characterization data of polyamide aerogel under uniaxial quasistatic compression at 23° C.

| Solids' [% w/w] | $\rho_o$ [g cm$^{-3}$] | Strain rate [s$^{-1}$] | Young's modulus [E, MPa] | Speed of sound [m s$^{-1}$][a] | Ultimate strength [MPa] | Ultimate Strain' [%] | Specific energy [J g$^{-1}$] |
|---|---|---|---|---|---|---|---|
| 10 | 0.288 | 0.008 | 33 ± 4 | 338 | 71 ± 9 | 80 ± 2 | 37.03 |
| 15 | 0.324 | 0.006 | 46 ± 12 | 375 | 77 ± 10 | 74 ± 2 | 36.52 |
| 20 | 0.361 | 0.005 | 50 ± 0 | 372 | 23 ± 1 | 61 ± 3 | 14.64 |
| 25 | 0.399 | 0.006 | 0.9 ± 0.1 | 47 | 5.2 ± 1.7 | 21 ± 7 | 2.77 |

[a]Calculated via equation 4.

Thermal Conductivity.

The thermal conductivity, $\lambda$, was calculated via equation 5.

$$\lambda = \rho_o \times C_p \times R \quad (5)$$

Figure 7:
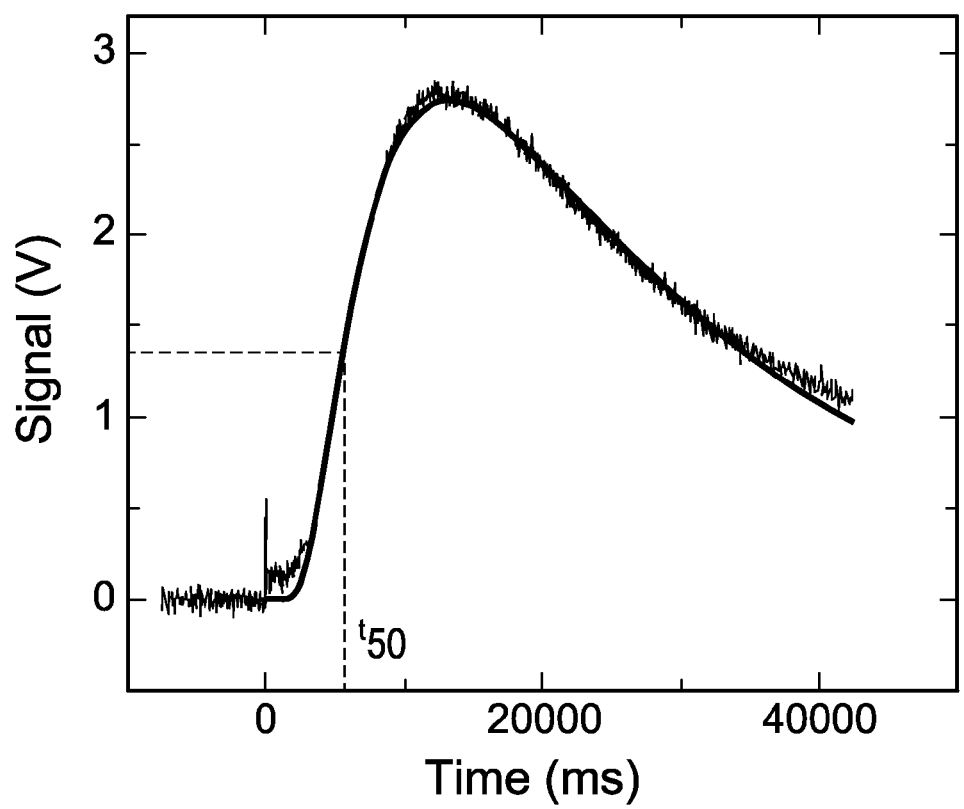
FIG. 7 provides a temperature curve of the back face of a polyamide aerogel disk (~1 cm in diameter, 2.53 mm thick, $\rho_o=0.28$ g cm$^{-3}$) coated with gold and carbon on both faces, following a heat pulse incident to the front face. Dashed reference lines indicate $t_{50}$, the time for the detector voltage (proportional to temperature) to reach half its maximum value. Data have been fitted to the pulse-corrected Cowan model.

These determinations involved measuring the bulk density, $\rho_o$, the thermal diffusivity, R, and the heat capacity, Cp. R was determined with a flash diffusivity method with disk samples ~1 cm in diameter, ~2.5 mm thick (the thickness of each sample was measured with 0.01 mm resolution and was entered as required by the data analysis software). Samples were coated with gold and carbon on both faces to minimize radiative heat transfer and ensure complete absorption of the heat pulse. Typical data are shown in FIG. 7. Dashed reference lines indicate $t_{50}$, the time for the detector voltage (which is proportional to temperature) to reach half its maximum value. Data have been fitted to the pulse-corrected Cowan model. Heat capacities, Cp, at 23° C. of powders of the same samples, were measured using Modulated Differential Scanning Calorimetry (MDSC) against several standards, as described in the Experimental Section. Relevant data for two polyamide aerogel samples at densities that yield the best mechanical properties in terms of Young's modulus, ultimate strength and energy absorption (Table 2), is summarized in Table 3.

TABLE 3

Thermal conductivity data for polyamide aerogels samples prepared by using the 10% w/w and the 15% w/w solids formulations at 23° C.

| Material | Bulk density, $\rho_o$ [g cm$^{-1}$] | Heat Capacity, Cp [J g$^{-1}$ K$^{-1}$] | Thermal diffusivity, R [mm$^2$ s$^{-1}$] | Thermal conductivity, $\lambda$ [W m$^{-1}$ K$^{-1}$] |
|---|---|---|---|---|
| 10% w/w | 0.280 ± 0.009 | 0.913 ± 0.028 | 0.111 ± 0.005 | 0.028 ± 0.002 |
| 15% w/w | 0.310 ± 0.023 | 1.114 ± 0.034 | 0.112 ± 0.002 | 0.039 ± 0.003 |

Although the lowest thermal conductivity achieved (0.028 W m$^{-1}$ K$^{-1}$) is above the record-low values reported for aerogels (<0.020 W m$^{-1}$ K$^{-1}$), nevertheless it is noted that it is between those for Styrofoam (0.030 W m$^{-1}$ K$^{-1}$) and polyurethane foam (0.026 W m$^{-1}$ K$^{-1}$). This fact should be put in perspective together with the relatively low density, the exceptional mechanical strength and the acoustic insulation value of these materials.

For certain polymer aerogels, the polymers have exhibited a bulk density that is ≤0.4 g/cc, a porosity ≥69%, a Young's modulus ≤50 MPa, a specific energy absorption ≤37 J/g, a speed of sound ≥47 m/s, and a thermal conductivity ≥0.028 W/m·K. In other polymer aerogels, the polymers have exhibited at least two of these properties, and in other polymers, at least two of these properties have been exhibited.

While the disclosure has been illustrated and described in detail in the figures and foregoing description, the same is to be considered as illustrative and not restrictive in character, it being understood that only selected embodiments have been shown and described and that all changes, modifications and equivalents that come within the spirit of the disclosures described heretofore and/or defined by the following claims are desired to be protected. In addition, all publications cited herein are indicative of the level of skill in the art and are hereby incorporated by reference in their entirety as if each had been individually incorporated by reference and fully set forth.

What claimed is:

1. A porous polyamide aerogel comprising the following repeating units:

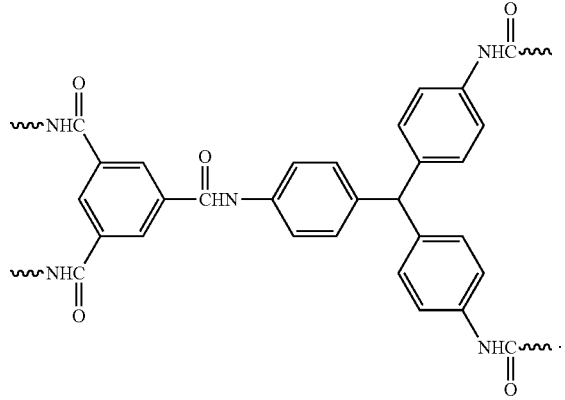

2. The porous polyamide aerogel of claim 1 having a hyperbranched structure.

3. The porous polyamide aerogel of claim 1, wherein the aerogel has a bulk density that is ≤0.4 g/cc, a porosity ≥69%, a Young's modulus ≤50 MPa, a specific energy absorption ≤37 J/g, a speed of sound ≥47 m/s, and a thermal conductivity ≥0.028 W/m·K.

4. The porous polyamide aerogel of claim 1, wherein at least 10% of the surface area is included in micropores.

5. A hyperbranched porous polyamide aerogel represented by the central formula:

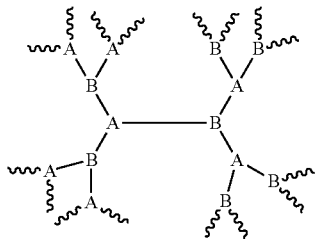

wherein:

(a) A is:

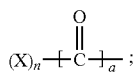

(b) B is:

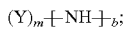

(c) X and Y are aromatic groups;

(d) units A and B are linked through an amide group; and (e) the ratio of (a+b):(n+m) is at least about 1:1.5.

6. A hyperbranched porous polyamide aerogel of claim 5 wherein A is:

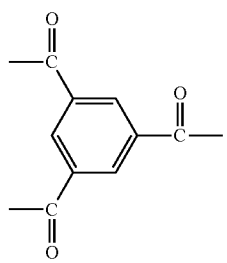

and B is:

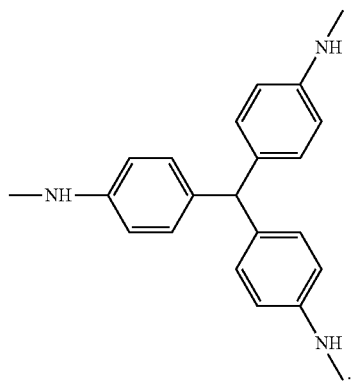

7. The hyperbranched porous polyamide aerogel of claim 5, wherein the aerogel exhibits at least four properties selected from the group consisting of a bulk density that is ≤0.4 g/cc, a porosity ≥69%, a Young's modulus ≤50 MPa, a specific energy absorption ≤37 J/g, a speed of sound ≥47 m/s, and a thermal conductivity ≥0.028 W/m·K.

8. The hyperbranched porous polyamide aerogel of claim 5, wherein the aerogel exhibits at least two properties selected from the group consisting of a bulk density that is ≤0.4 g/cc, a porosity ≥69%, a Young's modulus ≤50 MPa, a specific energy absorption ≤37 J/g, a speed of sound ≥47 m/s, and a thermal conductivity ≥0.028 W/m·K.

9. The hyperbranched porous polyamide aerogel of claim 5, wherein at least about 10% of the surface area is attributed to micropores.

10. A method for producing a porous polyamide hydrogel comprising:

combining a polyfunctional aromatic carboxylic acid and a polyfunctional aromatic isocyanate in an aprotic solvent to form a reaction mixture, and heating the reaction mixture to a temperature ≤135° C. to form a wet gel.

11. The method of claim 10, wherein heating the reaction mixture involves heating the reaction mixture to a temperature ≤90° C.

12. The method of claim 10, wherein the polyfunctional aromatic carboxylic acid is trimesic acid, and the polyfunctional aromatic isocyanate is selected from the group consisting of tris(4-isocyanatophenyl)methane, methylene biphenyl diisocyanate, 1,3-phenylene diisocyanate, 1,1'-biphenyl diisocyanate and 1,1'oxy-bis-(isocyanatobenzene).

13. The method of claim 12, wherein the polyfunctional aromatic isocyanate is tris(4-isocyanatophenyl)methane.

14. The method of claim 12, wherein the aprotic solvent is DMF.

15. The method of claim 14, further including:
adding a solvent miscible with supercritical $CO_2$; and
drying the wet gel with supercritical $CO_2$.

16. The method of claim 14, wherein adding a solvent miscible with supercritical $CO_2$ involves adding acetone.

17. The method of claim 10, wherein the polyfunctional aromatic carboxylic acid and the polyfunctional aromatic isocyanate include functional groups and aromatic rings having a ratio, and the ratio of functional groups to aromatic rings is at least about 1:1.5.

18. The method of claim 10, wherein combining a polyfunctional aromatic carboxylic acid and a polyfunctional aromatic isocyanate in an aprotic solvent to form a reaction mixture involves combining proportions of polyfunctional carboxylic acid, polyfunctional aromatic isocyanate and an aprotic solvent in amounts to provide a polymer slurry containing between 5 and 25 wt. % solid.

19. The method of claim 18, wherein combining a polyfunctional aromatic carboxylic acid and a polyfunctional aromatic isocyanate in an aprotic solvent to form a reaction mixture involves combining proportions of polyfunctional carboxylic acid, polyfunctional aromatic isocyanate and an aprotic solvent in amounts to provide a polymer slurry containing between 10 and 25 wt. % solid.

20. The method of claim 18, wherein combining a polyfunctional aromatic carboxylic acid and a polyfunctional aromatic isocyanate in an aprotic solvent to form a reaction mixture involves combining proportions of polyfunctional carboxylic acid, polyfunctional aromatic isocyanate and an aprotic solvent in amounts to provide a polymer slurry containing between 10 and 15 wt. % solid.

* * * * *